(12) United States Patent
Fan et al.

(10) Patent No.: US 8,860,595 B1
(45) Date of Patent: Oct. 14, 2014

(54) SCALABLE VOLTAGE RAMP CONTROL FOR POWER SUPPLY SYSTEMS

(71) Applicant: Fairchild Semiconductor Corporation, San Jose, CA (US)

(72) Inventors: Siqiang Fan, Foothill Ranch, CA (US); Andrew Kameya, Irvine, CA (US); Bin Zhao, Irvine, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/870,627

(22) Filed: Apr. 25, 2013

(51) Int. Cl.
 *H03M 1/66* (2006.01)
 *H02M 7/02* (2006.01)

(52) U.S. Cl.
 CPC ..................................... *H02M 7/02* (2013.01)
 USPC ........... 341/144; 323/271; 323/282; 323/283; 323/298; 331/109; 327/419; 327/450; 326/16; 324/537; 713/323; 713/324; 713/300

(58) Field of Classification Search
 CPC ..... H02M 3/157; H02M 3/158; H02M 3/156; G06F 1/3287; G06F 1/28; G06F 11/002; G06F 1/3203; G06F 1/3296; G06F 1/324; G05F 1/575; G01R 27/28; H01J 37/32706; H01L 21/31116; H01L 21/31138; H01L 21/32136; H04W 52/0245; Y02B 60/1285; Y02B 60/1217

USPC ................. 341/144; 323/271, 282, 283, 298; 331/109; 307/43, 9.1; 327/419, 540; 326/16; 324/537; 713/323, 324, 300; 700/295

See application file for complete search history.

(56) References Cited

U.S. PATENT DOCUMENTS

| | | | | |
|---|---|---|---|---|
| 5,745,375 | A * | 4/1998 | Reinhardt et al. | 700/286 |
| 6,396,256 | B1 * | 5/2002 | Arsenault et al. | 324/537 |
| 7,049,879 | B2 * | 5/2006 | Osamura et al. | 327/419 |
| 7,439,718 | B2 | 10/2008 | Rozen et al. | |

* cited by examiner

*Primary Examiner* — Lam T Mai

(74) *Attorney, Agent, or Firm* — Grossman Tucker Perreault & Pfleger PLLC

(57) ABSTRACT

A system for scalable voltage ramp control for power supply systems. A system may comprise at least power supply circuitry, digital-to-analog (D/A) converter circuitry and a controller. The power supply circuitry may be configured to output a voltage to a load based on an input voltage provided by the D/A converter. The controller may be configured to control the D/A converter (e.g., to cause the D/A converter to provide the input voltage to the power supply circuitry) using a large range voltage ramp-up or a small range voltage ramp-up. Utilization of the large range voltage ramp-up or the small range voltage ramp-up by the controller may be based on, for example, a threshold voltage.

19 Claims, 6 Drawing Sheets

SCALABLE VOLTAGE RAMP CONTROL FOR POWER SUPPLY SYSTEMS

TECHNICAL FIELD

The present disclosure relates to power supply control, and more particularly, to systems for controlling power supply operation to minimize output voltage overshoot and undershoot.

BACKGROUND

Accurately controlling the voltage output from a power supply does not simply entail the provision of an input voltage that will, based on the configuration of the power supply, generate the desired output voltage. Providing too high a voltage at too fast a rate will cause the power supply output to overshoot or undershoot the desired voltage. The output voltage overshoot or undershoot may be caused, for example, by a delay in response caused by characteristics of components in the circuitry of the power supply. Devices like inductors and capacitors, as well as other devices having inductive and capacitive qualities, may take time to become charged, and then may discharge to some extent as the power supply approaches steady state. This type of behavior causes the voltage output by the power supply to continually overshoot and then undershoot the desired voltage until equilibrium is achieved.

Voltage overshoot and undershoot may be detrimental to system performance. Voltage overshoot can cause stress to sensitive components in the load (e.g., processors), and at worst may damage sensitive components to the extent where the load may malfunction, resulting in expense and possibly a dangerous situation. Overshoot is also a waste of energy, which may be problematic in portable or mobile devices wherein energy conservation is an important feature. Likewise, undershoot may negatively impact the operation of sensitive components in the load, and activation of the load may be delayed in order to avoid such impact, which may result in reduced system performance. Existing control techniques such as Dynamic Voltage Scaling (DVS) have helped to minimize overshoot and undershoot in power supply output voltage, but are not equipped to handle the demands of emerging applications that are more complicated, more sensitive, and require more accuracy, faster performance, etc. to reduce load stress and conserve energy.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
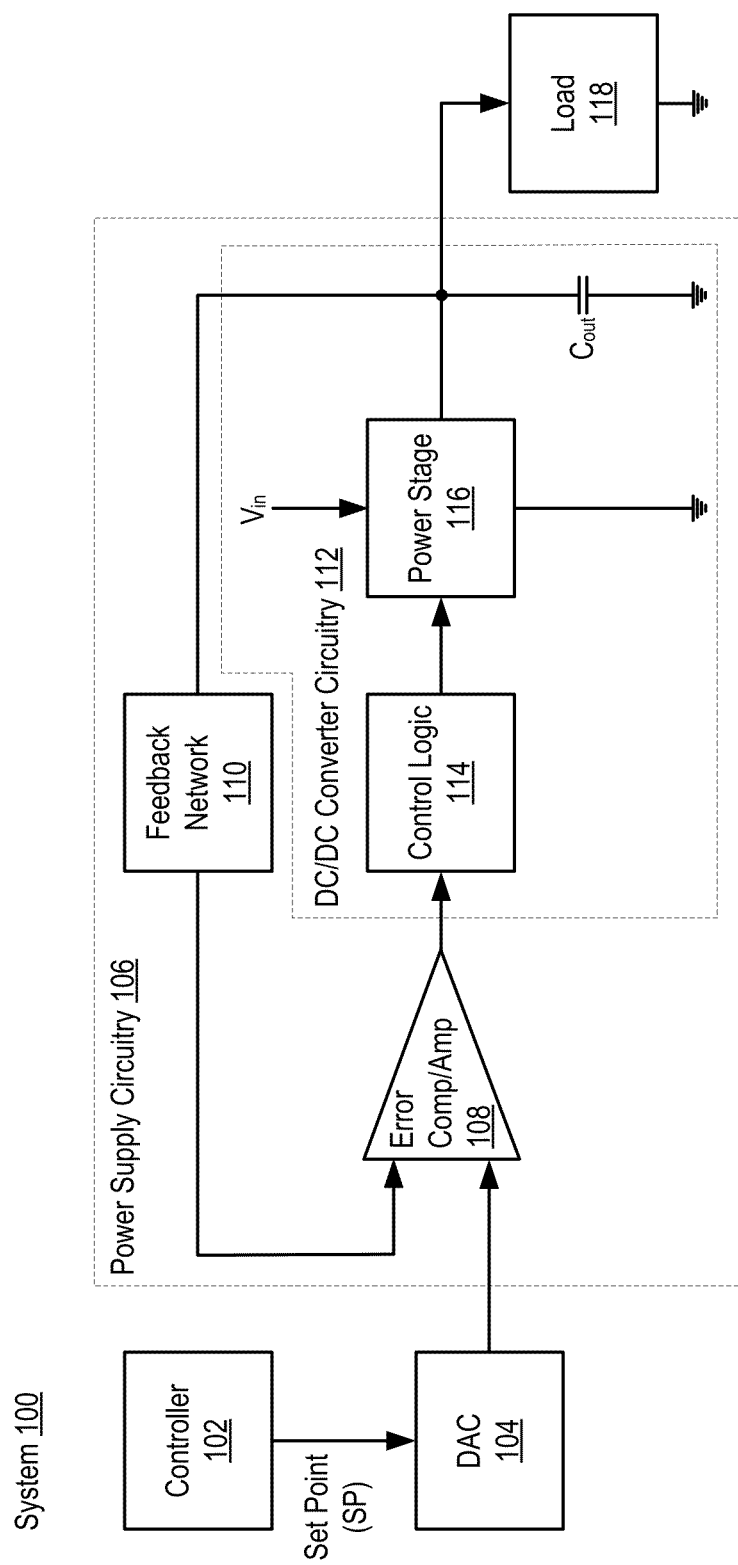
FIG. 1 illustrates an example system usable in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

In general, this disclosure describes systems and methods for providing scalable voltage ramp control for power supply systems. A system may comprise at least power supply circuitry, digital-to-analog (D/A) converter circuitry and a controller. The power supply circuitry may be configured to output a voltage to a load based on an input voltage provided by the D/A converter. The controller may be configured to control the D/A converter (e.g., to cause the D/A converter to provide the input voltage to the power supply circuitry) using a large range voltage ramp-up or a small range voltage ramp-up. Utilization of the large range voltage ramp-up or the small range voltage ramp-up by the controller may be based on, for example, a threshold voltage.

In one embodiment, the power supply circuitry may include DC/DC converter circuitry, and the threshold voltage may be based on characteristics of the DC/DC converter circuitry. For example, the characteristics of the DC/DC converter may be used to determine a voltage level at which a different voltage ramp-up may be exercised to help avoid output voltage overshoot and undershoot. In operation the controller may be configured to determine the difference between an old target voltage (e.g., current output voltage of the system) and a new target voltage, and to compare the difference to the threshold voltage. If the difference is determined to be greater than the threshold voltage then the large range ramp-up may be employed, and alternatively, the small range ramp-up may be used if the difference is determined to be less than the threshold voltage.

In one embodiment, when employing the large range ramp-up the controller may be configured to provide digital codes to the D/A converter, the digital codes causing the input voltage generated by the D/A converter to be increased incrementally by a first delta (e.g., by a certain amount of voltage). This operation may continue until the controller determines that another incremental increase in the input voltage (e.g., by the first delta) would cause the output voltage generated by the power supply circuitry to be equal to or exceed an intermediate target voltage. Then, the controller may be configured to output a digital code to cause the output voltage to equal the intermediate target voltage. For example, the intermediate target voltage may be configured based on the threshold voltage, and may indicate the point at which a different voltage ramp-up may be employed to minimize output voltage overshoot and undershoot. The controller may then be configured to again provide digital codes to the D/A converter, the digital codes causing the input voltage to be increased incrementally by a second delta smaller than the first delta. This operation may continue until the controller determines that incrementally increasing the input voltage by the second delta would cause the output voltage to be equal to or exceed the new target voltage. Afterwards, the controller may be configured to output a digital code to cause the output voltage to equal the new target voltage. The old target voltage may then be set to the current new target voltage, and a new target voltage, along with a new ramp rate, may be selected.

In the same or a different embodiment, the small range ramp-up may be employed by the controller when the difference between the old target voltage and the new target voltage is less than the threshold voltage. The controller may be configured to first determine whether the old target voltage is equal to, higher than or less than the new target voltage. If it is determined that the old target voltage equals the new target voltage, then the system is not required to act (e.g., the system is already at the new target voltage). If it is determined that the old target voltage is greater than the new target voltage, then the controller may operate (e.g., output digital codes) to cause the output voltage to drop. If the controller determines that the old target voltage is less than the new target voltage, the controller may then provide digital codes to the D/A converter, the digital codes causing the input voltage to be increased incrementally by a third delta. In one embodiment the second delta may be equal to the third delta. This operation may continue until the controller determines that incrementally increasing the input voltage by the third delta would cause the output voltage to be equal to or exceed the new target voltage. The controller may be further configured to output a digital code to cause the output voltage to equal the new target voltage. The old target voltage may then be set to the current new target voltage, and a new target voltage, along with a new ramp rate, may be selected.

FIG. 1 illustrates example system 100 usable in accordance with at least one embodiment of the present disclosure. System 100 may comprise controller 102, D/A converter (DAC) 104, power supply circuitry 106 and load 118. Controller 102 may be, for example, a microprocessor integrated circuit (IC). In one example of operation, controller 102 may be configured to receive output voltage targets for power supply circuitry 106 via an interface (e.g., from another control entity). Controller 102 may be configured to output digital codes to DAC 104, the digital codes representing analog voltage levels corresponding to a set point (SP) for power supply circuitry 106. For example, the SP may be increased incrementally by controller 102 (e.g., using a first, second or third delta, which will be explained in regard to FIG. 2.) in pursuit of a desired target voltage. DAC 104 may be configured to receive digital codes from controller 102 and to output analog voltages based on the digital codes. DAC 104 may be an individual IC, or controller 102 may incorporate the functionality described with respect to DAC 104 and may simply output the analog voltage to power supply circuitry 106. Power supply circuitry 106 may include, for example, error comparator or error amplifier 108 (Error Comp/Amp 108), feedback network 110 and DC/DC converter circuitry 112. In one embodiment, error comparator or error amplifier 108 may be configured to receive an analog voltage from DAC 104 and a feedback voltage via feedback network 110, and to provide the difference between the two voltages, either in digital format or analog format, to DC/DC converter circuitry 112.

DC/DC converter circuitry 112 may be based on an existing converter topology such as, for example, buck, boost, buck-boost, single-ended primary-inductor converter (SEPIC), flyback, power factor correction (PFC) flyback, half-bridge, full-bridge, Ćuk, etc. For the most part, the above DC/DC converter topologies include basic elements such as control logic 114 coupled to power stage 116, which controls how a supply voltage ($V_{in}$) may be supplied to a reservoir or tank capacitor ($C_{out}$). The output voltage (e.g., the voltage across $C_{out}$) may be provided to load 118, as well as back to error comparator or error amplifier 108 via feedback network 110. The various elements described with respect to DC/DC converter circuitry 112 may include capacitors or inductors, or may at least exhibit capacitive or inductive behavior, that may cause the voltage output from DC/DC converter circuitry 112 to overshoot and undershoot the target voltage. This behavior may prove problematic in that circuitry contained in load 118 could be damaged, leading to costly repair or even dangerous operation in load 118, and further from an energy conservation standpoint in that overshoot wastes power. In at least one embodiment, overshoot may be minimized by controlling how the input voltage is increased incrementally (e.g., ramped-up) to generate the desired output voltage from power supply circuitry 106.

Figure 2:
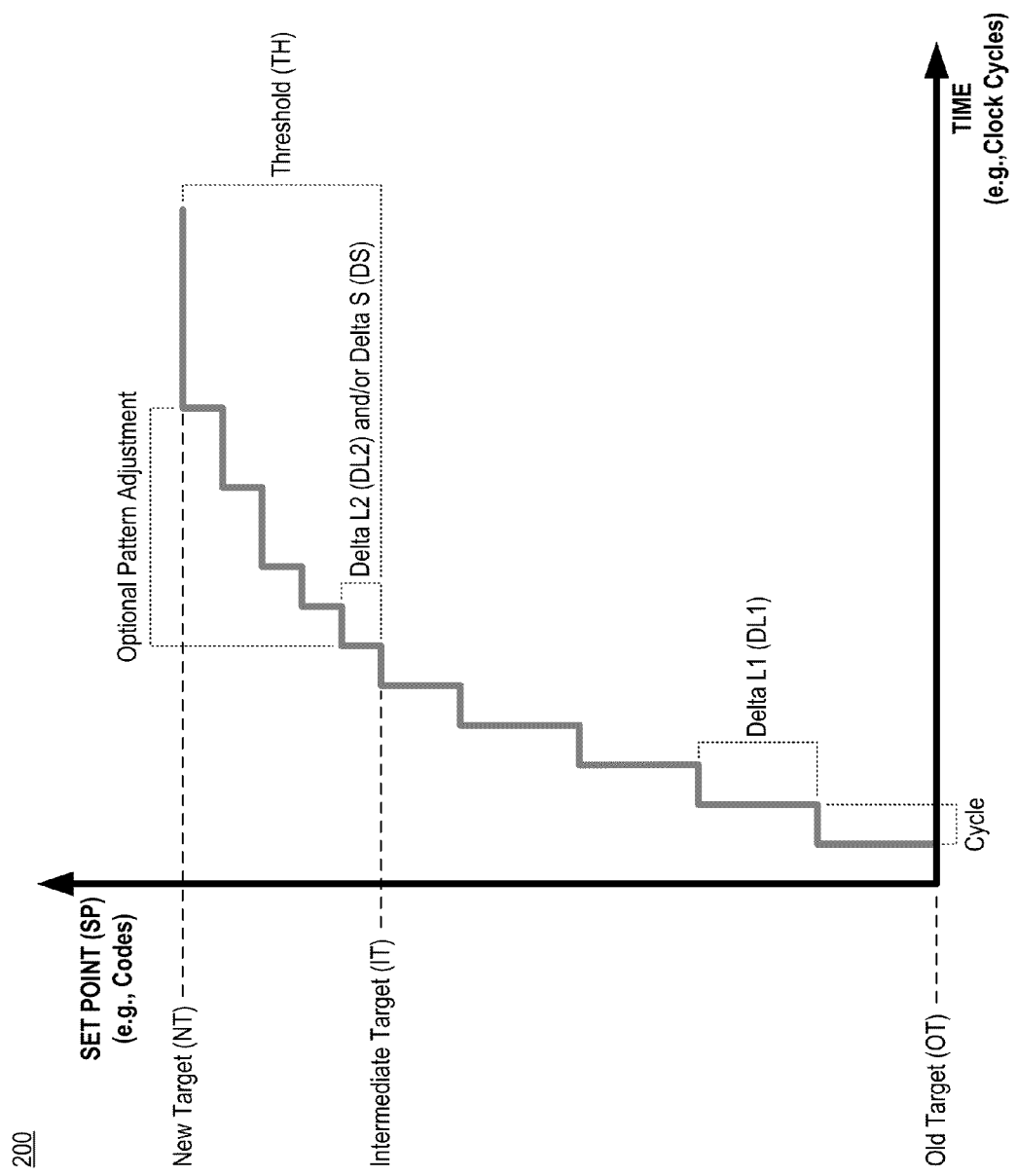
FIG. 2 illustrates an example of a voltage ramp curve labeled with various characteristics in accordance with at least one embodiment of the present disclosure.

FIG. 2 illustrates an example voltage ramp curve 200 labeled with various characteristics in accordance with at least one embodiment of the present disclosure. Voltage ramp curve 200 has been provided merely for the sake of example (e.g., to explain various quantities that will be referenced in the explanation of flowcharts disclosed in FIG. 3-5), and is not meant to limit the embodiments disclosed herein to any particular mode of operation or situation. Voltage ramp curve 200 discloses how the SP (e.g., in terms of digital codes output by controller 102) may be increased incrementally over time (e.g., clock cycles) in a manner consistent with this disclosure. While the relationship of digital codes vs. clock cycles is disclosed in 200, similar relationships may be expressed in different terms while still remaining within the scope of this disclosure (e.g., analog input voltage output from DAC 104 vs. seconds, etc.).

Three example target voltages are shown in voltage ramp curve 200: old target voltage (OT), new target voltage (NT) and intermediate target voltage (IT). The OT is the starting point for voltage ramp curve 200. The OT may be the previous NT (e.g., if the previous voltage ramp achieved the desired output voltage), and may be equal to the set point (SP) output by controller 102 at the start of voltage ramp curve 200. The NT may be the desired output voltage of power supply circuitry 106 when voltage ramp 200 is completed. Voltage curve 200 is shown ramping at a first delta L1 (DL1)/cycle starting from the OT and incrementally increasing in voltage. In one embodiment, the DL1 may be defined as a number of codes/cycle, which may be based on a ramp rate set when NT is selected.

The IT may correspond to a voltage level where the manner in which the input voltage is incrementally increased (e.g., the digital codes being output from controller 102) may be altered. In one embodiment, the IT may be determined by subtracting a threshold voltage (TH) from the NT, the TH being based on various behavioral characteristics of DC/DC converter circuitry 112. As shown in voltage ramp 200, following the IT the digital codes output by controller 102 ramp at a second delta L2 (DL2) and/or third delta S (DS) if, for example, a small range ramp is being executed. The ramp rates of DL2 and DS are smaller than DL1, and in at least one embodiment may be equal. This is because continuing to ramp up at DL1 following the IT is likely to cause an overshoot in the output voltage. The ramp rate may therefore be reduced at or near the IT to provide a more controlled voltage ramp. An optional pattern adjustment may also be carried out in order to further refine how the voltage ramps to NT. In one embodiment, the optional pattern may be based on, for example, holding a particular digital code longer than one time cycle. For example, the pattern illustrated in voltage range curve 200 is "1122" in that the first two codes are held for one clock cycle and the second two codes are held for two clock cycles. The pattern illustrated in FIG. 2 is for the sake of explanation only, and is not intended to limit embodiments to only this pattern. As will be seen in FIG. 6, different patterns may be employed in accordance with various embodiments, each of the different patterns yielding different responses.

Figure 3:
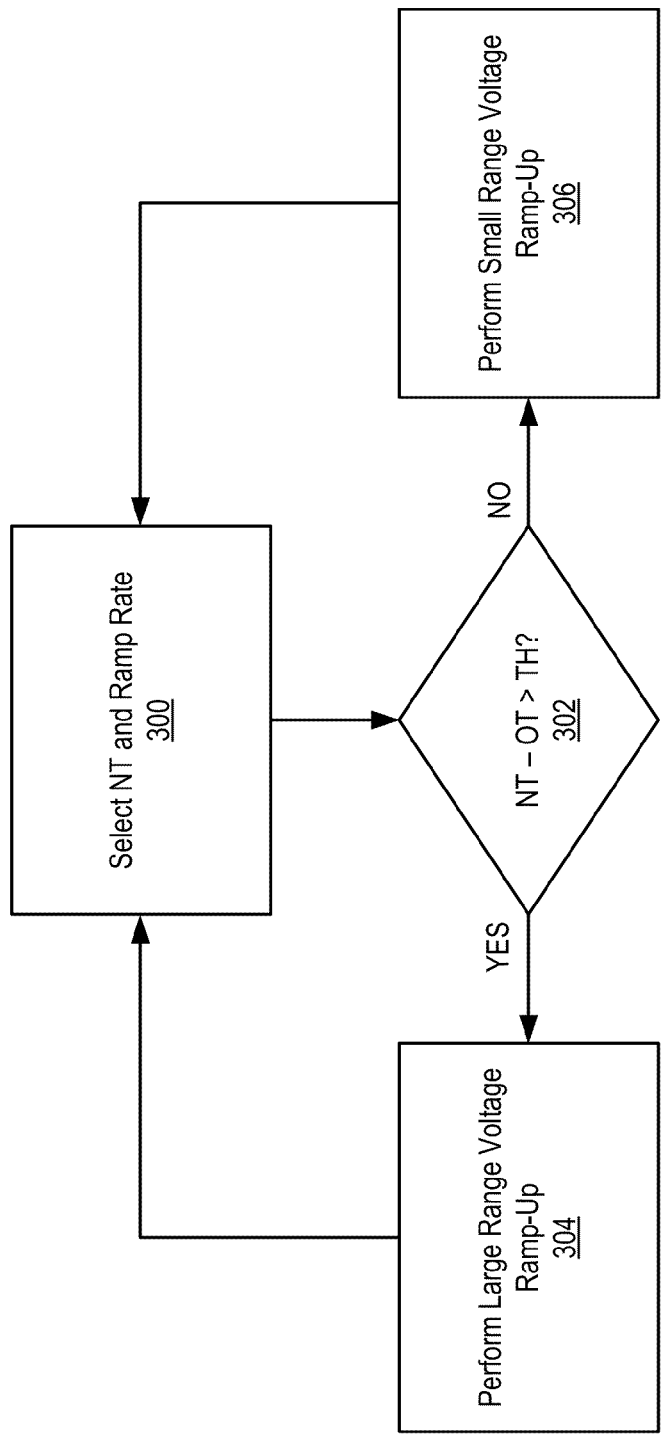
FIG. 3 illustrates example operations for scalable voltage ramp control for power supply systems in accordance with at least one embodiment of the present disclosure.

FIG. 3 illustrates example operations for scalable voltage ramp control for power supply systems in accordance with at least one embodiment of the present disclosure. In operation 300 an NT and target ramp rate may be selected. The NT and target ramp rate may be selected based on, for example, program code that is executing in controller 102, a predetermined configuration in controller 102, a user configuration in controller 102, etc. In operation 302 a determination may then be made as to whether the difference between the NT and the OT (e.g., which may be the previous NT) is greater than the TH (NT−OT>TH?). If it is determined that the NT−OT>TH, then in operation 304 a large range voltage ramp-up may be performed. This is because the amount of voltage to gain is greater than the threshold, and thus, a larger delta (e.g., DL1) may be employed to increase the input voltage faster, and likewise the output voltage, improving responsiveness. If it is determined in operation 302 that NT−NO<TH, then using the large delta (e.g., DL1) could cause overshoot, and thus, in operation 306 a small range voltage ramp-up may be performed using a smaller delta (e.g., DS) that may increase the input and output voltages at a slower rate but also provides more-refined control.

Figure 4:
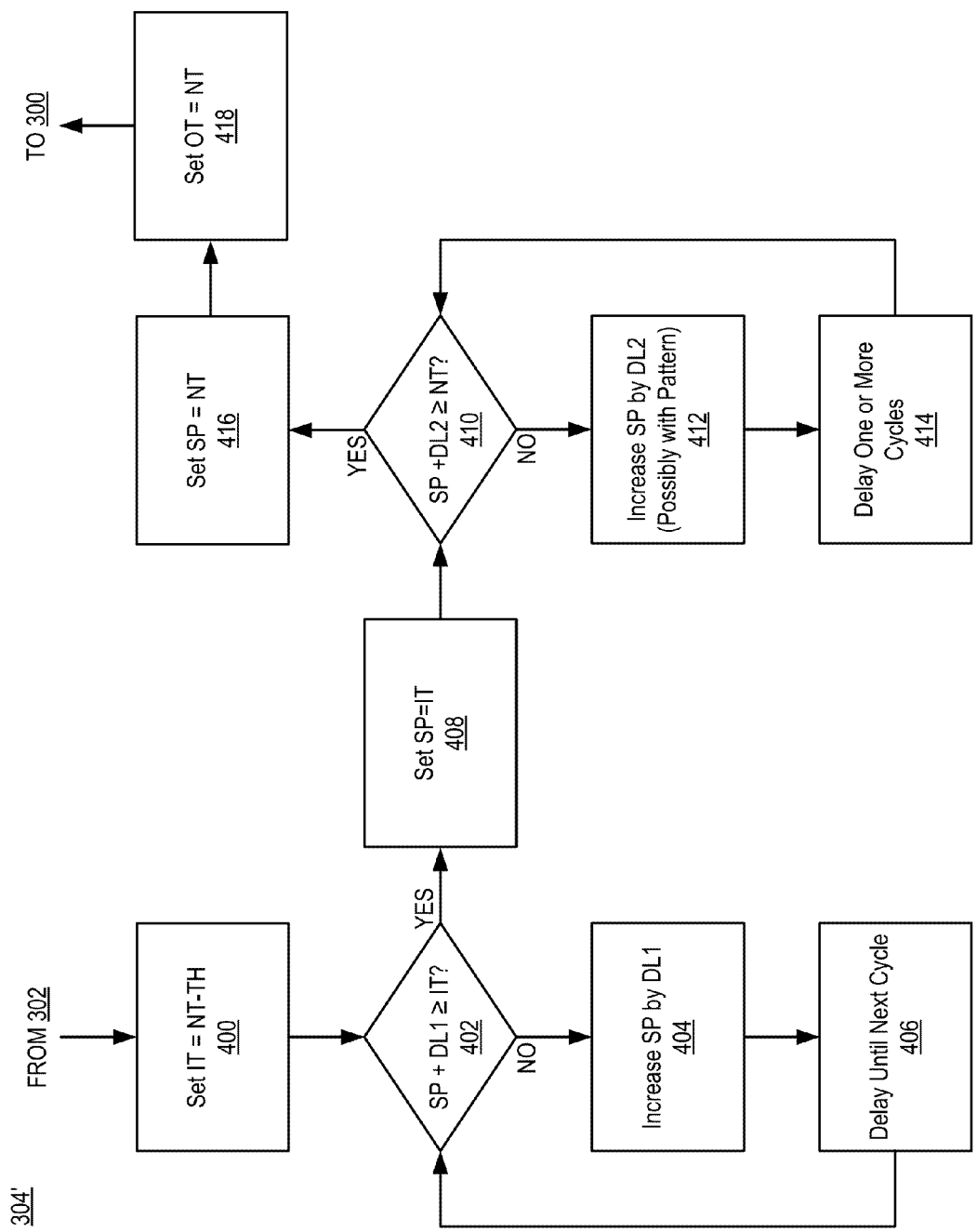
FIG. 4 illustrates a flowchart of example operations for large range voltage ramp-up in accordance with at least one embodiment of the present disclosure.

FIG. 4 illustrates a flowchart of example operations for large range voltage ramp-up 304' in accordance with at least one embodiment of the present disclosure. Coming from operation 302 in FIG. 3, in operation 400 the IT may be set by subtracting the TH from the NT (IT=NT−TH). The IT sets the voltage level where the delta used for incrementally increasing the digital code should be changed to, for example, provide for more refined control. In operation 402 a determination may then be made as to whether increasing the SP by a first delta (DL1) will cause the SP to be equal to or exceed the IT (SP+DL1≥IT?). If it is determined in operation 402 that SP+DL1<IT, then in operation 404 the SP may be increased by DL1 (e.g., controller 102 may output a digital code corresponding to an analog voltage value increased by DL1, and then controller 102 may delay for a time period (e.g., one clock cycle) in operation 406 before returning to operation 402 to determine whether the SP may again be increased by DL1. If it is determined in operation 402 that the SP cannot be increased without being equal to or exceeding the IT, then in operation 408 the SP may be set to the current value of the IT (SP=IT).

A determination may then be made in operation 410 as to whether increasing the SP by a second delta (DL2) will cause the SP to be equal to or exceed the NT (SP+DL2≥NT?). If it is determined in operation 410 that SP+DL2<NT, then in operation 412 the SP may be increased by DL2 (e.g., controller 102 may output a digital code corresponding to an analog voltage value increased by DL2, and then controller 102 may wait for one or more time periods in operation 414 before returning to operation 410 to determine whether the SP may again be increased by DL2. For example, the incremental increase may also be performed in accordance with an optional timing pattern, so it is possible for controller 102 to delay more than one clock cycle in operation 414 based on the particular timing pattern being employed. If it is determined in operation 410 that the SP cannot be increased without being equal to or exceeding the NT, then in operation 416 the SP may be set to the current value of the NT (SP=NT) and in operation 418 the OT may be set to the current value of the NT (OT=NT) prior to returning to operation 300 (in FIG. 3).

Figure 5:
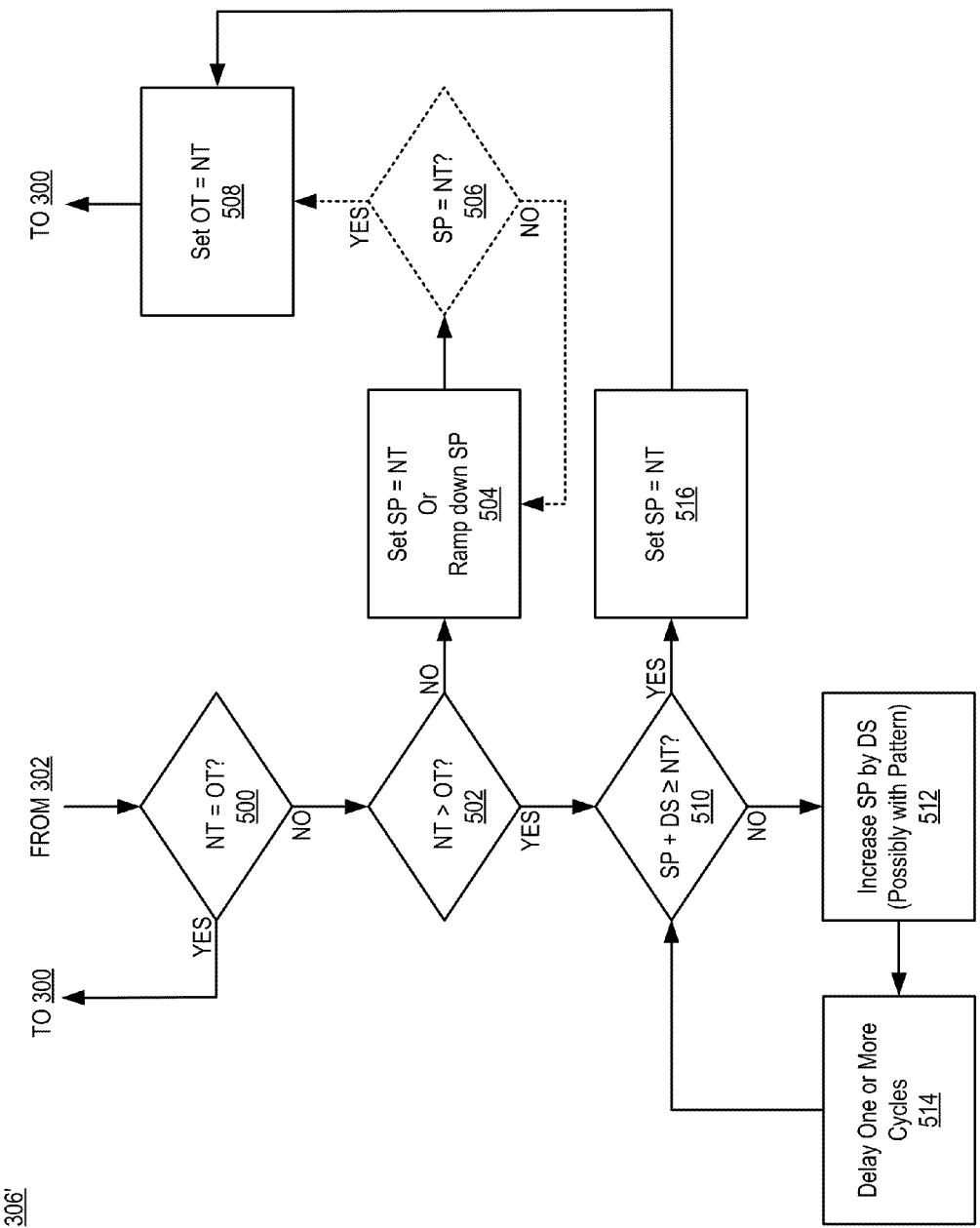
FIG. 5 illustrates a flowchart of example operations for small range voltage ramp-up in accordance with at least one embodiment of the present disclosure.

FIG. 5 illustrates a flowchart of example operations for small range voltage ramp-up 306' in accordance with at least one embodiment of the present disclosure. Coming from operation 302 in FIG. 3, in operation 500 a determination may be made as to whether NT is equal to OT (NT=OT?). A determination that NT=OT in operation 500 may be followed by a return to operation 300 in FIG. 3 (e.g., no action is required because the related voltage of DC/DC converter circuitry 112 is already at NT). Alternatively, in operation 502 a determination may be made as to whether the NT is greater than the OT (NT>OT?). If it is determined in operation 502 that NT<OT, then in operation 504 SP may be set to the current value of NT (SP=NT) or a ramp-down may occur. Whether SP=NT or a ramp-down occurs may depend on the particular application in which system 100 has been employed. For example, if load 118 is particularly sensitive, or power conservation is a concern, then a ramp-down may occur. Otherwise, SP may be set to the current value of NT and the voltage may be allowed to drop in due course. Operation 504 may optionally be followed (e.g., where there is a requirement for a ramp-down) by operation 506 wherein a further determination may be made as to whether the SP is equal to the NT (SP=NT?). If it is determined in operation 506 that SP=NT, then in operation 508 the OT may be set to the current value of the NT prior to returning to operation 300 in FIG. 3.

If in operation 502 it is determined that NT>OT, then in operation 510 a determination may then be made as to whether increasing the SP by a third delta (DS) will cause the SP to be equal to or exceed the NT (SP+DS≥NT?). If it is determined in operation 510 that SP+DS<NT, then in operation 512 the SP may be increased by DS (e.g., controller 102 may output a digital code corresponding to an analog voltage value increased by DS, and then controller 102 may wait for one or more time periods in operation 514 before returning to operation 510 to determine whether the SP may again be increased by DS. For example, the incremental increase may also be performed in accordance with an optional timing pattern, so it is possible for controller 102 to delay more than one clock cycle in operation 514 based on the particular timing pattern being employed. If it is determined in operation 510 that the SP cannot be increased without being equal to or exceeding the NT, then in operation 516 the SP may be set to the current value of NT (SP=NT), which may be followed by a return to operation 508 wherein the OT may be set to the current value of the NT (OT=NT) prior to returning to operation 300 (in FIG. 3).

Figure 6:
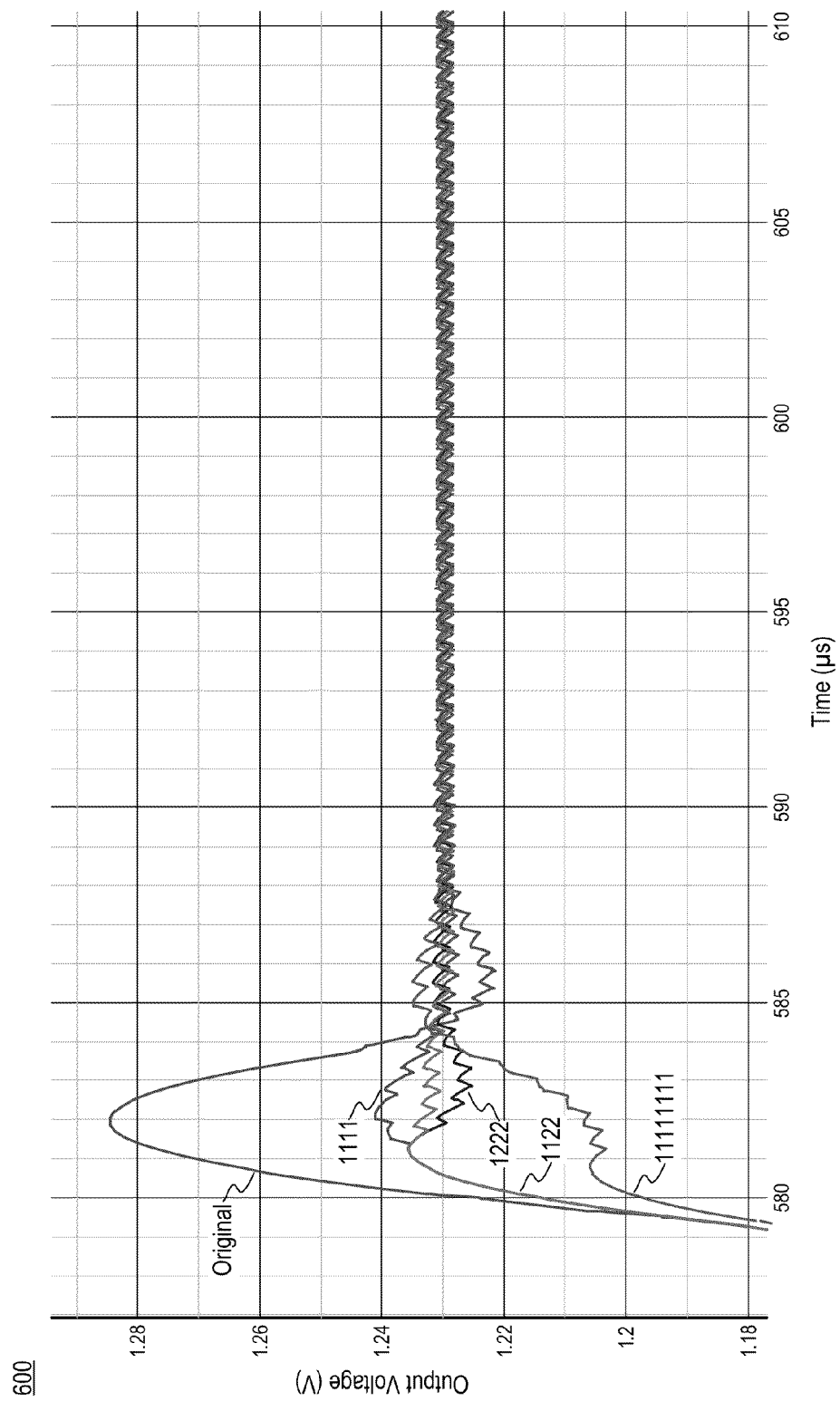
FIG. 6 illustrates an example chart of the effect of timing patterns on output voltage in accordance with at least one embodiment of the present disclosure.

FIG. 6 illustrates an example chart 600 of the effect of timing patterns on output voltage in accordance with at least one embodiment of the present disclosure. Chart 600 plots Output Voltage (V) vs. Time (μs) for output voltages seen from power supply circuitry 106 when employing different timing patterns. In the examples illustrated in FIG. 6, the large range ramp-up employ four code/cycle increment (DL1) for all the cases, while the small range ramp-ups are different. For example, the curve identified as "original" is an example of output voltage without any application of an embodiment consistent with the present disclosure. The curve identified as "1111" demonstrates the effect of an embodiment consistent with the present disclosure utilizing a timing pattern wherein the small range ramp-up comprises one code/cycle increment (DL2) for four cycles. The curve identified as "1222" illustrates a timing pattern wherein the small range ramp-up comprises one code/cycle increment followed by three one code/two-cycle increments. The curve identified as "1122" illustrates a timing pattern wherein the small range ramp-up comprises two one code/cycle increments followed by two one code/two-cycle increments. The curve identified as "11111111" illustrates a timing pattern wherein the small range ramp-up includes eight one code/cycle increments. The various response curves illustrated in FIG. 6 demonstrate, for example, that using different timing patterns may affect the amount of overshoot/undershoot seen in the output voltage of power supply circuitry 106.

While FIGS. 3-5 illustrate various operations according to different embodiments, it is to be understood that not all of the operations depicted in FIGS. 3-5 are necessary for other embodiments. Indeed, it is fully contemplated herein that in other embodiments of the present disclosure, the operations depicted in FIGS. 3-5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

"Circuitry", as used in any embodiment herein, may comprise, for example, singly or in any combination, individual components, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure provides systems and methods for scalable voltage ramp control for power supply systems. A system may comprise at least power supply circuitry, digital-to-analog (D/A) converter circuitry and a controller. The power supply circuitry may be configured to output a voltage to a load based on an input voltage provided by the D/A converter. The controller may be configured to control the D/A converter (e.g., to cause the D/A converter to provide the input voltage to the power supply circuitry) using a large range voltage ramp-up or a small range voltage ramp-up. Utilization of the large range voltage ramp-up or the small range voltage ramp-up by the controller may be based on, for example, a threshold voltage.

The following examples pertain to further embodiments. In one example embodiment there is provided a device. The device may include power supply circuitry configured to output an output voltage to a load based on an input voltage, digital to analog (D/A) converter circuitry configured to provide the input voltage to the power supply circuitry, and a controller configured to use a large range voltage ramp-up or a small range voltage ramp-up in controlling the D/A converter circuitry, the large range voltage ramp-up or the small range voltage ramp-up being used by the controller based on a threshold voltage.

In another example embodiment there is provided a method, the method may include selecting a new target voltage and a ramp rate for controlling a voltage output from power supply circuitry, determining whether the difference between an old target voltage and the new target voltage is greater than a threshold voltage, and causing an input voltage to be provided to drive the power supply circuitry using a large range voltage ramp-up or a small-range voltage ramp-up based on the determination.

In another example embodiment there is a provided at least one machine-readable storage medium. The machine readable medium may have stored thereon, individually or in combination, instructions that when executed by one or more processors result in the following operations comprising selecting a new target voltage and a ramp rate for controlling a voltage output from power supply circuitry, determining whether the difference between an old target voltage and the new target voltage is greater than a threshold voltage, and causing an input voltage to be provided to drive the power supply circuitry using a large range voltage ramp-up or a small-range voltage ramp-up based on the determination.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
    power supply circuitry configured to output an output voltage to a load based on an input voltage, the power supply circuitry including at least DC/DC converter circuitry;
    digital to analog (D/A) converter circuitry configured to provide the input voltage to the power supply circuitry; and
    a controller configured to use a large range voltage ramp-up or a small range voltage ramp-up in controlling the D/A converter circuitry, the large range voltage ramp-up or the small range voltage ramp-up being used by the controller based on a threshold voltage based on operational characteristics of at least the DC/DC converter circuitry.

2. The device of claim 1, wherein the large range voltage ramp-up configures the controller to:
    output digital codes to the D/A converter circuitry causing the input voltage to be increased incrementally by a first delta, the controller being configured to output the digital codes to the D/A converter circuitry until it is determined by the controller that increasing incrementally by the first delta would cause the output voltage to be equal to or exceed an intermediate target voltage; and
    output a digital code to cause the output voltage to equal the intermediate target voltage.

3. The device of claim 2, wherein after the determination that that increasing incrementally by the first delta would cause the output voltage to be equal to or exceed an intermediate target voltage, the controller is further configured to:

output digital codes to the D/A converter circuitry causing the input voltage to be increased incrementally by a second delta smaller than the first delta, the controller being configured to output the digital codes until it is determined by the controller that increasing incrementally by the second delta would cause the output voltage to be equal to or exceed a new target voltage; and output a digital code to cause the output voltage to equal the new target voltage.

4. The device of claim 2, wherein the controller is configured to output digital codes to the D/A converter based on a timing pattern.

5. The device of claim 1, wherein the small range voltage ramp-up configures the controller to determine if an old target voltage is equal to, greater than or less than a target voltage.

6. The device of claim 1, wherein if controller determines that the old target voltage is less than the target voltage by no more than the threshold, the controller being further configured to:

output digital codes to the D/A converter circuitry causing the input voltage to be increased incrementally by a third delta, the controller being configured to output the digital codes to the D/A converter circuitry until increasing incrementally by the third delta would cause the output voltage to be equal to or exceed the new target voltage; and output a digital code to cause the output voltage to equal the new target voltage.

7. The device of claim 6, wherein the controller is configured to output the digital codes to the D/A converter based on a timing pattern.

8. A method, comprising:

selecting a new target voltage and a ramp rate for controlling a voltage output from power supply circuitry;

determining whether the difference between an old target voltage and the new target voltage is greater than a threshold voltage; and causing an input voltage to be provided to drive the power supply circuitry using a large range voltage ramp-up or a small-range voltage ramp-up based on the determination.

9. The method of claim 8, wherein the power supply circuitry comprises DC/DC converter circuitry, the threshold voltage being based on operational characteristics of at least the DC/DC converter circuitry.

10. The method of claim 8, wherein the large range voltage ramp-up comprises:

outputting digital codes causing the input voltage to increase incrementally by a first delta based on the ramp rate until it is determined that increasing incrementally by the first delta would cause the output voltage to be equal to or exceed an intermediate target voltage;

outputting a digital code to cause the output voltage to equal the intermediate target voltage;

outputting digital codes causing the input voltage to increase incrementally by a second delta smaller than the first delta until it is determined that increasing incrementally by the second delta would cause the output voltage to be equal to or exceed the new target voltage; and outputting a digital code to cause the output voltage to equal the new target voltage.

11. The method of claim 10, wherein outputting digital codes is based on a timing pattern.

12. The method of claim 8, wherein the small range voltage ramp-up comprises:

determining if the old target voltage is equal to, greater than or less than the new target voltage;

maintaining the target voltage based on the old target voltage being determined to be equal to the new target voltage;

outputting digital codes causing the input voltage to decrease based on the old target voltage being determined to be larger than the new target voltage;

outputting digital codes causing the input voltage to be increased incrementally by a third delta until increasing incrementally by the third delta would cause the output voltage to be equal to or exceed the new target voltage based on the old target voltage being determined to be less than the new target voltage; and outputting a digital code to cause the output voltage to equal the new target voltage.

13. The method of claim 12, wherein outputting digital codes is based on a timing pattern.

14. At least one non-transitory machine-readable storage medium having stored thereon, individually or in combination, instructions that when executed by one or more processors result in the following operations comprising:

selecting a new target voltage and a ramp rate for controlling a voltage output from power supply circuitry;

determining whether the difference between an old target voltage and the new target voltage is greater than a threshold voltage; and causing an input voltage to be provided to drive the power supply circuitry using a large range voltage ramp-up or a small-range voltage ramp-up based on the determination.

15. The medium of claim 14, wherein the power supply circuitry comprises DC/DC converter circuitry, the threshold voltage being based on operational characteristics of at least the DC/DC converter circuitry.

16. The medium of claim 14, wherein the large range voltage ramp-up comprises:

outputting digital codes causing the input voltage to increase incrementally by a first delta based on the ramp rate until it is determined that increasing incrementally by the first delta would cause the output voltage to be equal to or exceed an intermediate target voltage;

outputting a digital code to cause the output voltage to equal the intermediate target voltage;

outputting digital codes causing the input voltage to increase incrementally by a second delta smaller than the first delta until it is determined that increasing incrementally by the second delta would cause the output voltage to be equal to or exceed the new target voltage; and outputting a digital code to cause the output voltage to equal the new target voltage.

17. The medium of claim 16, wherein outputting digital codes is based on a timing pattern.

18. The medium of claim 14, wherein the small range voltage ramp-up comprises:

determining if the old target voltage is equal to, greater than or less than the new target voltage;

maintaining the target voltage based on the old target voltage being determined to be equal to the new target voltage;

outputting digital codes causing the input voltage to decrease based on the old target voltage being determined to be larger than the new target voltage;

outputting digital codes causing the input voltage to be increased incrementally by a third delta until increasing incrementally by the third delta would cause the output voltage to be equal to or exceed the new target voltage based on the old target voltage being determined to be less than the new target voltage; and outputting a digital code to cause the output voltage to equal the new target voltage.

19. The medium of claim 18, wherein outputting digital codes is based on a timing pattern.

\* \* \* \* \*

UNITED STATES PATENT AND TRADEMARK OFFICE
CERTIFICATE OF CORRECTION

PATENT NO. : 8,860,595 B1  
APPLICATION NO. : 13/870627  
DATED : October 14, 2014  
INVENTOR(S) : Siqiang Fan et al.

It is certified that error appears in the above-identified patent and that said Letters Patent is hereby corrected as shown below:

In the Claims

In Column 8, line 65, in Claim 3, delete the second occurrence of "that".

Signed and Sealed this  
Fourteenth Day of April, 2015

Michelle K. Lee  
*Director of the United States Patent and Trademark Office*